United States Patent
Edelmann et al.

(10) Patent No.: US 8,979,381 B2
(45) Date of Patent: Mar. 17, 2015

(54) BEARING DEVICE AND MANUFACTURING METHOD THEREOF

(71) Applicant: Aktiebolaget SKF, Göteborg (SE)

(72) Inventors: Ludwig Edelmann, Sulzthal (DE); Matthias Schuler, Stadtlauringen (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 14/024,596

(22) Filed: Sep. 11, 2013

(65) Prior Publication Data

US 2014/0072252 A1   Mar. 13, 2014

(30) Foreign Application Priority Data

Sep. 11, 2012  (DE) .......................... 10 2012 216 077

(51) Int. Cl.

| | | |
|---|---|---|
| F16C 33/76 | (2006.01) | |
| F16C 33/78 | (2006.01) | |
| F16C 41/00 | (2006.01) | |
| F16J 15/32 | (2006.01) | |
| F16C 43/04 | (2006.01) | |
| F16C 19/38 | (2006.01) | |
| F16C 19/50 | (2006.01) | |

(52) U.S. Cl.
CPC ............... *F16C 33/76* (2013.01); *F16C 33/783* (2013.01); *F16C 33/7883* (2013.01); *F16C 41/007* (2013.01); *F16J 15/3264* (2013.01); *F16C 43/045* (2013.01); *F16C 33/7813* (2013.01); *F16C 19/386* (2013.01); *F16C 19/505* (2013.01); *F16C 2226/12* (2013.01); *F16C 2326/02* (2013.01)

USPC .......................................................... 384/448

(58) Field of Classification Search
USPC .......................................................... 384/448
See application file for complete search history.

(56) References Cited

U.S. PATENT DOCUMENTS

| | | | | |
|---|---|---|---|---|
| 5,002,287 | A * | 3/1991 | Eskilsson ...................... | 384/448 |
| 5,131,763 | A * | 7/1992 | Caron ........................... | 384/448 |
| 5,166,611 | A * | 11/1992 | Kujawa et al. ................ | 384/448 |
| 5,470,157 | A * | 11/1995 | Dougherty et al. ........... | 384/448 |
| 5,476,272 | A * | 12/1995 | Hixson, II .................... | 384/448 |
| 5,530,344 | A * | 6/1996 | Caillaut et al. ................ | 324/174 |
| 5,564,839 | A * | 10/1996 | Ouchi et al. .................. | 384/448 |
| 5,863,124 | A * | 1/1999 | Ouchi et al. .................. | 384/448 |
| 5,893,648 | A * | 4/1999 | Smith ........................... | 384/448 |
| 6,186,667 | B1 * | 2/2001 | Nakamura et al. ............ | 384/448 |
| 7,455,459 | B2 * | 11/2008 | Toth et al. .................... | 384/448 |
| 7,909,333 | B2 | 3/2011 | Greca | |

FOREIGN PATENT DOCUMENTS

| | | |
|---|---|---|
| DE | 4438947 A1 | 5/1996 |
| DE | 10317782 A1 | 11/2004 |
| DE | 102008063597 A1 | 7/2010 |
| EP | 0937984 A1 | 8/1999 |

* cited by examiner

*Primary Examiner* — Thomas R. Hannon
(74) *Attorney, Agent, or Firm* — Bryan Peckjian; SKF USA Inc. Patent Dept.

(57) ABSTRACT

A bearing device includes a first bearing element and at least one second bearing element that is movably supported relative to the first bearing element and at least one seal unit that includes at least one attachment element that plays a role in attaching at least one seal element of the seal unit to the first bearing element. The attachment element includes at least a part of an antilock braking system (ABS) ring. The ABS ring may include through openings and be usable with a sensor that senses a magnetic field generated by the ABS ring.

11 Claims, 1 Drawing Sheet

US 8,979,381 B2

BEARING DEVICE AND MANUFACTURING METHOD THEREOF

CROSS-REFERENCE

This application claims priority to German patent application no. 10 2012 216 077.9 filed on Sep. 11, 2012, the contents of which are fully incorporated herein by reference.

TECHNICAL FIELD

The invention relates to a bearing device having a seal support element that includes at least a portion of an antilock braking system (ABS) ring.

BACKGROUND

A bearing device is known that includes a first bearing element and at least one second bearing element that is movably supported relative to the first bearing element. The device further includes at least one seal unit that has at least one attachment element. The attachment element plays a role in the attachment of at least one seal element of the seal unit to the first bearing element, serving as a support and/or a guide for the at least one seal element, for example.

SUMMARY

One aspect of the present invention is to provide a bearing device of the above-mentioned type in a highly efficient manner. Embodiments of the invention are directed to a bearing device including a first bearing element and at least one second element that is movably supported relative to the first bearing element. The bearing device includes at least one seal unit that has at least one attachment element, and the attachment element plays a role at least in the attachment of at least one seal element of the seal unit to the first bearing element.

The attachment element may include at least a part of an antilock braking system (ABS) ring, and a high efficiency can be achieved using the disclosed inventive design. Embodiments of the invention provide a simple and economical construction or structure, a construction or structure having a small number of parts and/or a small number of surfaces that require precise machining or finishing, for example. Furthermore, it allows a simple assembly to be achieved.

Preferably, the attachment element is formed as a unitary or a one-piece element. "One-piece" in this disclosure should be understood to mean produced from a single casting and/or from a single injection molding and/or an attachment element that can be separated into multiple pieces only by destroying the attachment element. In this way a structurally simple design can be achieved.

Furthermore, a method for manufacturing a bearing device is proposed in which an attachment element is provided with at least one seal element that includes at least a part of an ABS ring. The attachment element is attached to a bearing element and in this way a high efficiency can be achieved. In particular, a simple assembly and a simple and inexpensive construction or structure can be achieved.

BRIEF DESCRIPTION OF THE DRAWINGS

Further advantages will become apparent from the following description of the drawings. An exemplary embodiment of the invention is shown in the drawings. The drawings, the description, and the claims contain numerous features in combination. Persons of ordinary skill in the art will also advantageously consider the features individually and in further meaningful combinations.

DETAILED DESCRIPTION

Figure 1:
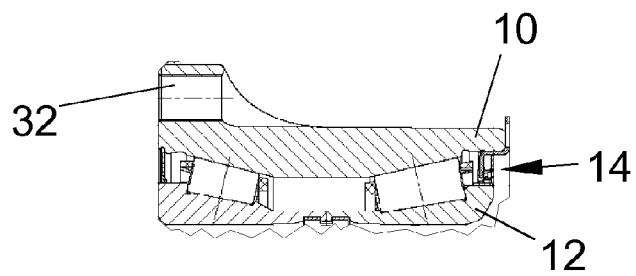
FIG. 1 shows a partial section through a part of an inventive bearing device.

FIG. 1 shows a partial section through a part of an inventive bearing device which device includes a rolling-element bearing formed as a double row tapered roller bearing. The rolling-element bearing includes a first bearing element 10 formed as an outer ring and a second bearing element 12 formed as an inner ring. The outer ring is rotatably supported relative to the inner ring. The bearing device also includes a seal unit 14 having an attachment element 16. The attachment element is used for attaching a seal element 18 of the seal unit to the first bearing element.

The attachment element 16 is formed as a one-piece element from a plate and is attached by a friction-fit to the outer ring. The attachment element 16 further includes an antilock braking system (ABS) ring 20 at its radial outer portion. The ABS ring includes an annular plate portion having through-holes 22 that are disposed at regular spacings or intervals with respect to one another around the circumferential direction of the ABS ring.

The bearing device is configured for use as the wheel bearing of a truck. The ABS ring is disposed on an end side 24 of the outer ring, which end side 24 is opposite the side of the outer ring that is configured for attachment to a wheel. The bearing device also includes attachment arrangement 32 for attaching a wheel.

Figure 2:
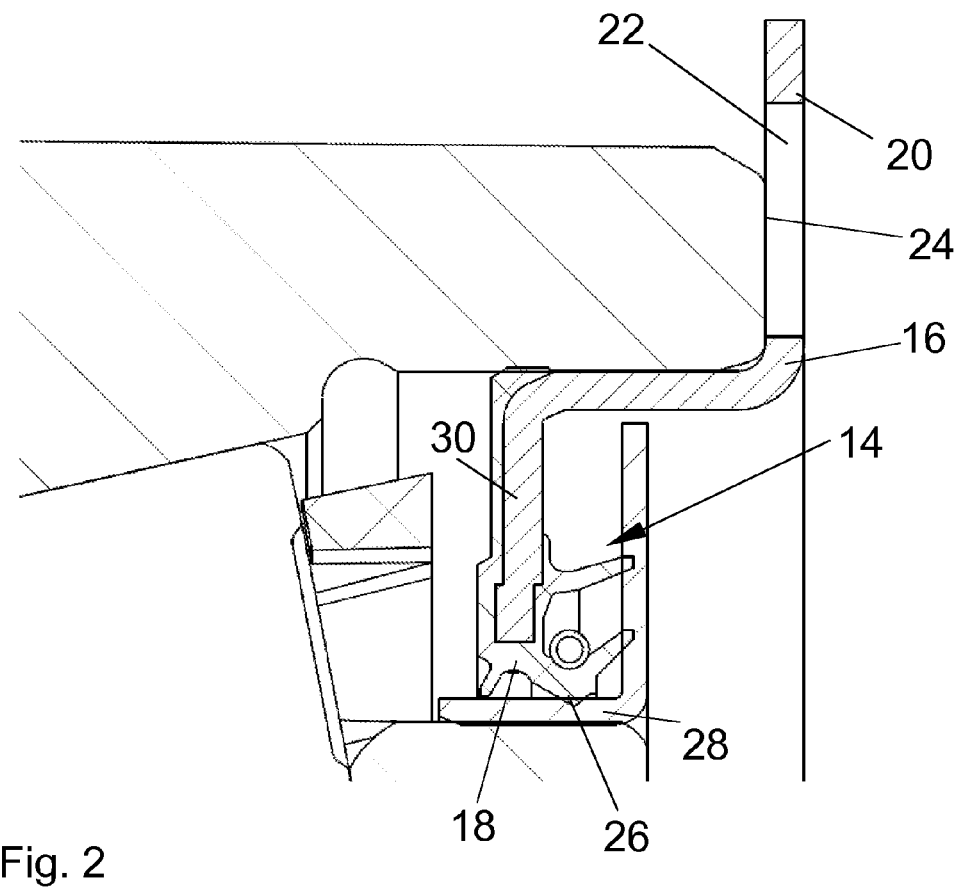
FIG. 2 shows an enlarged detail from FIG. 1.

A ring component 28 is attached to the inner ring, and a first sealing lip 26 and a further sealing lip of the seal element 18 abut on the ring component 28. These two sealing lips extend substantially in the radial direction of the bearing device. The seal element 18 further comprises two further sealing lips that extend substantially in the axial direction of the bearing device and which also abut on the component 28. The sealing element 18 is attached to a portion 30 of the attachment element which projects radially inward from the ABS ring. As shown in Figure 2, At least a majority of the ring component 28 is disposed in a spaced defined radially and axially between the first and second bearing elements 10, 12, while the through-holes 22 are disposed radially outside of this space.

The seal element is configured to seal the rolling-element bearing to prevent or substantially prevent the leakage of lubricant and ingress of contaminants.

In an installed state, the bearing device is part of a truck (not illustrated), and the truck includes a sensor element (not illustrated) which is disposed opposite the ABS ring. The ABS ring generates a magnetic field that is quantitatively detected by the sensor element. When the outer ring turns or rotates, the ABS ring also turns or rotates relative to the sensor element, and the sensor element detects a magnetic field which changes periodically due to the through-holes in the ABS ring. From this magnetic field, a computer unit on the truck can calculate a rotational speed and an acceleration of the outer ring.

In the manufacturing of the bearing device described above, the attachment element on which the seal element 18 is attached is itself attached to the outer ring.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Reference Number List
- 10 Bearing element
- 12 Bearing element
- 14 Seal unit
- 16 Attachment element
- 18 Seal element
- 20 ABS ring
- 22 Through-holes
- 24 End side
- 26 Sealing lip
- 28 Component
- 30 Region
- 32 Attachment means

The invention claimed is:

1. A bearing device comprising:
a first bearing element;
at least one second bearing element, wherein the first bearing element is movably supported relative to the at least one second bearing element, the first bearing element and the at least one second bearing element radially and axially defining a space therebetween;
at least one seal unit including at least one attachment element coupled with the first bearing element, and at least one seal element coupled with the at least one attachment element; and
a ring component coupled with the at least one second bearing element and extending radially therefrom, wherein the ring component moves with the at least one second bearing element, and the at least one seal element seals with the ring component,
wherein the attachment element defines a plurality of through-holes that are detectable to determine a speed of the first bearing element, the plurality of through-holes being movable with the first bearing element and providing at least a part of an antilock braking system (ABS) ring, and
wherein at least a majority of the ring component is disposed in the space, and the plurality of through-holes are disposed radially outside of the space.

2. The bearing device according to claim 1, wherein the attachment element is formed as a one-piece element.

3. The bearing device according to claim 1, wherein the attachment element is attached to the first bearing element at least in part by a friction-fit.

4. The bearing device according to claim 1, wherein the attachment element comprises a plate in which the through-holes are defined.

5. The bearing device according to claim 1, wherein the first bearing element is an outer ring.

6. The bearing device according to claim 1, wherein the at least a part of the ABS ring is disposed on an axial end side of the first bearing element.

7. The bearing device according to claim 1, wherein the seal element has at least one sealing lip abutting on the second bearing element and/or on the ring component of the bearing device, which component is attached to the second bearing element.

8. The bearing device according to claim 1, wherein the attachment element is formed as a one-piece element, wherein the attachment element is attached to the first bearing element at least in part by a friction-fit, wherein the attachment element is at least partially made from a plate, wherein the first bearing element is an outer ring, wherein the at least part of the ABS ring is disposed on an axial end side of the first bearing element.

9. The bearing device of claim 1, wherein the at least one seal element comprises:
one or more lips that extend axially and abut a radially-extending surface of the ring component; and
one or more lips that extend radially and abut an axially-extending surface of the ring component.

10. A method for manufacturing a bearing device comprising:
providing a first bearing element;
providing at least one second bearing element and movably supporting the first bearing element relative to the at least one second bearing element, the first bearing element and the at least one second bearing element radially and axially defining a space therebetween;
providing at least one seal unit for sealing the space between the first bearing element and the at least one second bearing element, the seal unit including:
at least one attachment element coupled with the first bearing element, including at least part of an antilock braking system (ABS) ring, and defining a plurality of through-holes; and
at least one seal element coupled with the attachment element;
providing a ring component coupled with the at least one second bearing element and extending radially therefrom, wherein the ring component moves with the at least one second bearing element and the at least one seal element seals with the ring component; and
connecting the at least one seal unit to the first bearing element,
wherein the at least one attachment element comprises a plate defining a plurality of through-holes that are detectable to determine a speed of the first bearing element, the plate being movable with the first bearing element, and
wherein at least a majority of the ring component is disposed in the space and the plurality of through-holes are disposed radially outside of the space.

11. A bearing device comprising:
a first bearing element;
at least one second bearing element wherein the first bearing element is movably supported relative to the at least one second bearing element, the first bearing element and the at least one second bearing element radially and axially defining a space therebetween;
a seal between the first bearing element and the second bearing element, the seal including a support plate on the first bearing element and a seal member supported by the support plate; and
a ring component coupled with the at least one second bearing element and extending radially therefrom, wherein the ring component moves with the at least one second bearing element and the seal member seals with the ring component,
wherein the support plate includes at least part of an antilock braking system (ABS) ring having a plurality of through openings that are movable with the first bearing element and are detectable to determine a speed of the first bearing element, and
wherein at least a majority of the ring component is disposed in the space and the plurality of through openings are disposed radially outside of the space.

* * * * *